United States Patent Office 3,461,140
Patented Aug. 12, 1969

3,461,140
PRODUCTION OF ETHYLENE OXIDE
Eckart Titzenthaler, Oberhausen, Germany, assignor to Badische Anilin- & Soda-Fabrik Aktiengesellschaft, Ludwigshafen (Rhine), Germany
No Drawing. Filed Mar. 10, 1965, Ser. No. 438,725
Claims priority, application Germany, Mar. 12, 1964, B 75,876
Int. Cl. C07d 1/14
U.S. Cl. 260—348.5
3 Claims

ABSTRACT OF THE DISCLOSURE

Production of ethylene oxide from ethylene and oxygen at elevated temperature in presence of silver catalyst containing compound of group II of Periodic System and compound of aluminum and/or boron.

---

The present invention relates to a process for the production of ethylene oxide by means of catalysts and in particular it relates to the use in the said process of catalysts which contain silver together with compounds of metals of Groups II and III of the Periodic System and carriers.

It is known that ethylene oxide can be prepared by reacting ethylene with oxygen at elevated temperatures in contact with silver catalysts. Catalysts may be used which consist solely of silver, but supported catalysts may also be used. The carriers chiefly used are oxides, silicates, carbides or metals themselves. Graphite has also already been recommended as a carrier. The active catalyst layer may be applied to the carrier in different ways. Thus it is possible to dip the carrier into a melt of a metal, to coat it with a layer of silver oxide which is then reduced, or to deposit the silver electrolytically on the carrier.

A reaction that competes with the desired formation of ethylene oxide is the combustion of ethylene to carbon dioxide. Many attempts have been made to suppress the undesirable reaction and to promote the formation of ethylene oxide by certain additions to the catalyst. According to U.S. patent specification No. 2,837,473, catalysts are obtained by anodic oxidation of alloys of silver with metals of Groups I to IV of the Periodic System so that some of the alloy components are removed. According to U.S. patent specification No. 2,829,116, part of the alkaline earth metal is dissolved out from an alloy of silver and alkaline earth metal which has been applied to a metallic carrier. British patent specification No. 951,990 describes catalysts which are obtained by wholly or partly dissolving out aluminum and calcium from a ternary alloy of silver, aluminum and calcium. Catalysts are known from British patent specification 711,601 which are obtained by reduction of silver oxide with which is incorporated a salt of an alkaline earth metal with an organic acid. German patent specification No. 1,066,569 describes silver catalysts which contain 0.1 to 3% of aluminum oxide and/or 0.01 to 0.3% of nickel.

It has now been found that ethylene oxide can be advantageously prepared from ethylene and oxygen at elevated temperature in contact with silver which has been applied to an inert carrier and which contains one or more compounds of Groups II and III of the Periodic System in the silver layer, by using a catalyst which has been obtained by applying a reducible silver compound to an inert carrier and reducing the silver compound, the silver layer containing a compound of a metal of Group II of the Periodic System of Elements in an amount of 0.5 to 12 atom percent, with reference to the silver, and an aluminum and/or boron compound in an amount of 0.1 to 4 atom percent with reference to the silver.

Contrasted with the prior art methods, the new process is distinguished by the fact that the catalysts give high yields of ethylene oxide with a high conversion and also that they exhibit an excellent selectivity and a long life. The process is particularly suitable for the conversion of gases having a low content, i.e., 1 to 3% by volume, of ethylene.

Examples of suitable reducible silver compounds are silver oxalate, silver formate, silver acetate and particularly silver oxide, prepared for example by precipitation of silver salt solutions with alkalies.

Among the compounds with metals of Group II of the Periodic System which are to be used as initial materials for the production of the catalyst, alkaline earth metal compounds are preferred. Examples of suitable alkaline earth metal salts are those derived from organic acids, such as barium lactate, calcium acetate, barium formate and strontium oxalate. Cadmium salts, such as cadmium acetate, are other suitable compounds with compounds of Group II. The content of the compound or compounds of a metal of Group II in the silver layer is advantageously 1 to 10 atom percent with reference to the silver.

Examples of suitable aluminum compounds are acid soluble aluminum oxide, aluminum hydroxide, aluminates, such as barium aluminate or silver aluminate, and particularly aluminum salts of organic acids, such as aluminum acetate, aluminum aminoacetate, aluminum lactate, aluminum oxalate and aluminum formate. Aluminum salts of inorganic acids such as aluminum nitrate are however also suitable, especially when they are added to the silver salt solutions prior to precipitation.

Particularly suitable boron compounds are borates, such as calcium, tetraborate, barium borate and silver borate, and also boric acid and boric esters. The content of boron and/or aluminum in the silver layer is advantageously from 0.5 to 2 atom percent with reference to silver.

A very simple method comprises applying a mixture of the reducible silver compound with the said other compounds to the carrier. It is also possible to impregnate the reducible silver compound which has been applied to the carrier with a solution or solutions of the other compounds prior to reduction.

Particularly suitable carriers are solid metal or nonmetal oxides or mixtures of xides. For example aluminum oxide, quartz, sodium aluminum silicate, corundum, graphite, silicon carbide or pumice may be used. The active catalyst layer on the carrier is generally 10 to 15% by weight.

Reduction of the silver oxide is carried out by conventional methods, for example by simple heating or by heating in the presence of a reducing agent. The reduction may be carried out for example in a stream of nitrogen which contains 5% of hydrogen. The activating aluminum and/or boron compounds and also the compounds of metals of Group II of the Periodic System may be at least partly changed by the reduction, but in any case they are present in acid-soluble form after reduction.

Conversion of the ethylene to ethylene oxide is in other respects carried out under the conventional conditions. Thus it is possible to use temperatures of 200° to 280° C., advantageously 230° to 250° C., at atmospheric or superatmospheric pressure, for example at up to 20 atmospheres. The oxygen is advantageously used in the form of air or other gases containing oxygen.

The invention is further illustrated by the following examples in which the parts specified are parts by weight, unless otherwise stated. Parts by weight bear the same relation to parts by volume as the gram to the cubic centimeter. In the examples:

yield =

$$\frac{\text{moles of ethylene converted into ethylene oxide}}{\text{moles of ethylene in the gas}} \times 100$$

and selectivity =

$$\frac{\text{moles of ethylene converted into ethylene oxide}}{\text{moles of reacted ethylene}} \times 100$$

Example 1

414 parts of silver nitrate is dissolved in 2,200 parts of totally demineralized water. An equimolecular amount of a 5% aqueous caustic soda solution is added while stirring at 15° to 20° C. until complete precipitation of the silver as silver oxide has been achieved. The precipitate is washed eight times with water and the water decanted off and finally the supernatant liquid is carefully removed by suction filtration. The moist silver oxide precipitate has incorporated with it, with vigorous stirring, 21 parts of barium in the form of barium lactate and 0.33 part of aluminum in the form of aluminum lactate, each dissolved in 70 parts of water.

1,500 parts of ceramic balls (consisting of fused aluminum oxide and aluminum silicate and having a diameter of 6 to 8 mm.) are heated by infrared heating to 60° to 70° C. in a rotating drum. While maintaining the said temperature, the silver oxide precipitate is sprayed onto the balls so that they are coated with a firmly adherent layer of silver oxide.

The catalyst is then dried at 105° C. and heated up in the presence of air to a temperature of 380° C. and this temperature is maintained for an hour. The catalyst is treated with hot 8% nitric acid for analysis; the solution contains (with reference to the shaped catalyst) 12% of silver, 0.94% of barium and 0.03% of aluminum.

325 parts of the catalyst is charged into a steel tube. 200 litres per hour of a gas mixture of 4.6% of ethylene, 6.7% of oxygen, 7.0% of carbon dioxide, 0.02 p.p.m. of ethylene chloride and 81.7% of nitrogen is passed over the catalyst at a temperature of 235° C. and at atmospheric pressure. To contain the violent initial reaction, which leads exclusively to the formation of carbon dioxide, the reaction should be inhibited during the early hours with a gas mixture of nitrogen and ethylene chloride. After an operational period of 311 hours, the off-gas contains 1.64% of ethylene oxide. For the straight passage, this represents, with reference to the ethylene supplied, a yield of ethylene oxide of 37% and a selectivity of 66%.

If the catalyst be prepared without adding aluminum lactate, the yield under otherwise the same conditions is 25% and the selectivity is 68%.

Example 2

The procedure of Example 1 is followed but 0.14 part of boron in the form of barium borate (similarly dissolved in 70 parts of water) is used instead of aluminum lactate.

The gas introduced consists of 4.7% of ethylene, 6.4% of oxygen, 7.3% of carbon dioxide and 0.01 p.p.m. of ethylene chloride, the remainder being nitrogen. After a period of operation of 200 hours, 1.54% of ethylene oxide is found in the off-gas. This is equivalent to a yield of ethylene oxide of 33% and a selectivity of 68%.

Example 3

A catalyst A (prepared according to Example 1 with aluminum lactate) and a catalyst B (prepared under otherwise the same conditions but without aluminum lactate) are tested in parallel tubes under the same conditions and at the same time. 200 liters of gas is passed per hour through each reaction tube at a temperature of 233° C. and at atmospheric pressure. The gas introduced is low in ethylene and contains 1.8% of ethylene, 6.2% of oxygen, 7.4% of carbon dioxide and the remainder nitrogen.

Catalyst A contains 12.6% of silver, 1.0% of barium and 0.03% of aluminum in a form soluble in nitric acid, the equivalent figures for catalyst B being 11.8% of silver, 0.9% of barium and 0.01% of aluminum. After 82 days, the off-gas in case A contains 0.98% of ethylene oxide and in case B 0.69%. In case A the yield is 54% and the selectivity 63%. In case B the equivalent figures are 38% for the yield and 70% for the selectivity.

Example 4

The procedure of Example 1 is followed but 0.35 part of aluminum in the form of aluminum acetate (similarly dissolved in 70 parts of water) is added to the silver oxide precipitate instead of aluminum lactate. The further production of the catalyst and the testing of the same are carried out as in Example 1.

The feed gas consists of 4.2% of ethylene, 5.4% of oxygen, 7.8% of carbon dioxide, 0.01 p.p.m. of ethylene chloride and the remainder nitrogen. After a period of operation of 186 hours, 1.52% of ethylene oxide is found in the off-gas. This is equivalent to a yield of ethylene oxide of 36% and a selectivity of 59%.

Example 5

The procedure of Example 1 is followed but 0.1 part of aluminum in the form of barium aluminate (similarly dissolved in 70 parts of water) is added to the silver oxide precipitate instead of aluminum lactate. The further production of the catalyst and testing thereof are carried out in a manner analogous to that described in Example 1.

The feed gas consists of 4.7% of ethylene, 6.5% of oxygen, 6.6% of carbon dioxide, 0.03 p.p.m. of ethylene chloride and the remainder nitrogen. After a period of operation of 268 hours, 1.45% of ethylene oxide is found in the off-gas. This is equivalent to a yield of ethylene oxide of 31% and a selectivity of 70%.

Example 6

The procedure of Example 1 is followed but 0.7 part of aluminum in the form of aluminum nitrate dissolved in a little water is added to the silver nitrate solution prior to precipitation. Further production of the catalyst and testing of the same correspond to the methods described in Example 1. The finished catalyst contains 14% of silver, 1.0% of barium and 0.03% of aluminum in a form soluble in nitric acid.

The gas introduced consists of 4.7% of ethylene, 6.3% of oxygen, 6.5% of carbon dioxide, 0.03 p.p.m. of ethylene chloride and the remainder nitrogen. After a period of operation of 399 hours, 1.69% of ethylene oxide is found in the off-gas. This is equivalent to a yield of 36% and a selectivity of 67%.

I claim:

1. A process for the production of ethylene oxide from ethylene and oxygen at elevated temperature in contact with silver which has been applied to an inert carrier and which contains a compound of a metal of group II and III of the Periodic System in the silver layer, wherein the catalyst used is obtained by application of a reducible silver compound to an inert carrier and reduction of the silver compound in a catalytically active amount, the silver layer containing a compound of a metal of group II of the Periodic System of Elements in an amount of 0.5 to 12 atom percent with reference to silver and a compound of aluminum and/or boron in an amount of 0.1 to 4 atom percent with reference to silver, the active catalyst layer on said carrier being 10 to 15% by weight.

2. A process as claimed in claim 1 wherein said carrier is aluminum oxide, quartz, sodium aluminum silicate, corundum, graphite, silicon carbide or pumice.

3. A process as claimed in claim 1 carried out at a temperature of from 200 to 280° C.

References Cited

UNITED STATES PATENTS

| | | | |
|---|---|---|---|
| 2,764,598 | 9/1956 | Egbert | 260—348.5 |
| 3,144,416 | 8/1964 | Hosoda | 260—348.5 |
| 3,207,700 | 9/1965 | Saffer | 260—348.5 |

FOREIGN PATENTS

| | | |
|---|---|---|
| 486,731 | 9/1952 | Canada. |
| 523,049 | 3/1956 | Canada. |
| 675,840 | 7/1952 | Great Britain. |
| 675,481 | 7/1952 | Great Britain. |
| 1,048,898 | 1/1959 | Germany. |
| 1,066,569 | 10/1959 | Germany. |
| 1,126,366 | 3/1962 | Germany. |

NORMA S. MILESTONE, Primary Examiner

U.S. Cl. X.R.

252—432, 443, 463

UNITED STATES PATENT OFFICE
CERTIFICATE OF CORRECTION

Patent No. 3,461,140 August 12, 196

Eckart Titzenthaler

It is certified that error appears in the above identified patent and that said Letters Patent are hereby corrected as shown below:

Column 2, line 47, "xides" should read -- oxides --. Column 6, line 1, "675,840" should read -- 675,480 --.

Signed and sealed this 14th day of April 1970.

(SEAL)
Attest:

Edward M. Fletcher, Jr.
Attesting Officer

WILLIAM E. SCHUYLER, JR.
Commissioner of Patents